(12) United States Patent
Gkoulalas-Divanis

(10) Patent No.: US 10,885,224 B2
(45) Date of Patent: *Jan. 5, 2021

(54) DATA DE-IDENTIFICATION WITH MINIMAL DATA CHANGE OPERATIONS TO MAINTAIN PRIVACY AND DATA UTILITY

(71) Applicant: International Business Machines Corporation, Armonk, NY (US)

(72) Inventor: Aris Gkoulalas-Divanis, Waltham, MA (US)

(73) Assignee: International Business Machines Corporation, Armonk, NY (US)

( * ) Notice: Subject to any disclaimer, the term of this patent is extended or adjusted under 35 U.S.C. 154(b) by 357 days.

This patent is subject to a terminal disclaimer.

(21) Appl. No.: 15/886,154

(22) Filed: Feb. 1, 2018

(65) Prior Publication Data

US 2019/0236309 A1 Aug. 1, 2019

(51) Int. Cl.
*G06F 21/62* (2013.01)

(52) U.S. Cl.
CPC ...... *G06F 21/6254* (2013.01); *G06F 21/6245* (2013.01)

(58) Field of Classification Search
CPC .......................... G06F 21/6245; G06F 21/6254
See application file for complete search history.

(56) References Cited

U.S. PATENT DOCUMENTS

| | | |
|---|---|---|
| 7,885,941 B2 | 2/2011 | Aggarwal et al. |
| 8,171,032 B2 | 5/2012 | Herz |
| 8,326,849 B2 * | 12/2012 | El Emam ............ G06F 21/6254 707/756 |
| 9,047,488 B2 | 6/2015 | Allen et al. |
| 9,202,078 B2 | 12/2015 | Abuelsaad et al. |
| 9,230,132 B2 * | 1/2016 | Gkoulalas-Divanis ...................... G06F 21/6227 |
| 9,589,151 B2 | 3/2017 | Deleeuw et al. |

(Continued)

FOREIGN PATENT DOCUMENTS

| | | |
|---|---|---|
| CN | 105160266 A | 12/2015 |
| EP | 2228735 A2 | 9/2010 |

OTHER PUBLICATIONS

Dewri, R. et al.; "Using Multi-objective Optimization to Analyze Data Utility and Privacy Tradeoffs in Anonymized Techniques"; https://pdfs.semanticscholar.org . . . ; 2008, pp. 1-38.

(Continued)

*Primary Examiner* — Linglan E Edwards
(74) *Attorney, Agent, or Firm* — Will Stock; Edell, Shapiro & Finnan, LLC

(57) ABSTRACT

Methods, systems, and computer program products are provided for producing de-identified data from a dataset. A first set of constraints are determined based on anonymity requirements from a privacy model. A second set of constraints are determined based on knowledge hiding requirements. A model is generated to determine minimum loss of analytic utility in the dataset for de-identification while satisfying the first set of constraints and the second set of constraints. The model is applied to the dataset to determine changes to the dataset for de-identification that satisfy the first set of constraints and the second set of constraints. De-identified data is produced by modifying the dataset in accordance with the determined changes.

6 Claims, 3 Drawing Sheets

(56) References Cited

U.S. PATENT DOCUMENTS

| | | | |
|---|---|---|---|
| 9,665,722 B2* | 5/2017 | Nagasundaram | G06F 21/6254 |
| 9,697,469 B2* | 7/2017 | McMahon | G06Q 10/04 |
| 9,785,792 B2 | 10/2017 | Barrett et al. | |
| 10,565,399 B2* | 2/2020 | Huang | G06F 21/6254 |
| 2008/0040346 A1 | 2/2008 | Aggarwal et al. | |
| 2009/0030778 A1* | 1/2009 | Zapata | G06Q 30/0205 705/7.34 |
| 2009/0303237 A1 | 12/2009 | Liu et al. | |
| 2010/0332537 A1* | 12/2010 | El Emam | G06F 16/2457 707/771 |
| 2012/0303616 A1 | 11/2012 | Abuelsaad et al. | |
| 2014/0040134 A1 | 2/2014 | Ciurea | |
| 2014/0237620 A1 | 8/2014 | Ukil et al. | |
| 2014/0351946 A1 | 11/2014 | Oikawa et al. | |
| 2014/0380489 A1 | 12/2014 | Hacid et al. | |
| 2015/0186653 A1* | 7/2015 | Gkoulalas-Divanis | G06F 21/60 726/26 |
| 2015/0213175 A1 | 7/2015 | Arai et al. | |
| 2015/0350844 A1 | 12/2015 | Agarwal et al. | |
| 2016/0012252 A1 | 1/2016 | Deleeuw et al. | |
| 2016/0154978 A1* | 6/2016 | Baker | G06F 16/285 726/26 |
| 2016/0306999 A1 | 10/2016 | Beinhauer et al. | |
| 2017/0083708 A1* | 3/2017 | Braghin | G06F 16/2365 |
| 2017/0243028 A1 | 8/2017 | Lafever et al. | |
| 2017/0255790 A1 | 9/2017 | Barrett et al. | |
| 2017/0329991 A1 | 11/2017 | Van Dyne et al. | |
| 2018/0219842 A1 | 8/2018 | Bellala et al. | |
| 2019/0102811 A1 | 4/2019 | Gupta et al. | |
| 2019/0114447 A1 | 4/2019 | Kuo et al. | |
| 2019/0303615 A1 | 10/2019 | Gkoulalas-Divanis | |
| 2019/0370497 A1 | 12/2019 | Gkoulalas-Divanis et al. | |

OTHER PUBLICATIONS

Emam, KE.; "Heuristics for De-identifying Health Data"; https://ieeexplore.ieee.org/document/45882321/pdf.; 2008, pp. 58-61.

Anonymously; "Deep Generative Models Using Manifold Learning"; http://ip.com/IPCOM/000251126D; Oct. 17, 2017.

Anonymously; "Automated Discovery and Masking of Sensitive Data"; http://ip.com/IPCOM/000240280D; Jan. 21, 2015.

Anonymously; "Provider Based Access Control to Reconciled Data"; http://ip.com/IPCOM/000238992D; Sep. 30, 2018.

List of IBM Patents or Patent Applications Treated as Related, Apr. 2018, 1 page.

Yahalom, Ran et al., "Constrained Anonymization of Production Data: A Constraint Satisfaction Problem Approach", Secure Data Management (2010), 13 pages (Year: 2010).

List of IBM Patents or Patent Applications Treated as Related, filed Jun. 18, 2019.

* cited by examiner

US 10,885,224 B2

DATA DE-IDENTIFICATION WITH MINIMAL DATA CHANGE OPERATIONS TO MAINTAIN PRIVACY AND DATA UTILITY

BACKGROUND

1. Technical Field

Present invention embodiments relate to methods, systems and computer program products for de-identification of a dataset. In particular, present invention embodiments relate to production of a new dataset by minimally distorting a dataset such that all anonymity constraints are satisfied and all non-conflicting sensitive knowledge hiding constraints are satisfied.

2. Discussion of the Related Art

Data anonymization, also known as data sanitization, is a process for protecting personally identifiable information, including both direct identifiers such as, for example, social security numbers, customer numbers, persons' full names, etc., and indirect identifiers, i.e., unique or rare combinations of attribute values in a dataset that can be used to re-identify individuals such as, for example, a 5-digit zip code, gender, and date of birth. Personal data that have been "sufficiently anonymized", following legal requirements, can be used for supporting secondary purposes, such as various types of analyses. For example, anonymized data can be used by companies to support data monetization initiatives by selling data collections for analytical purposes. Depending on insights that are to remain discoverable when mining the anonymized data, and types of analyses that are to be supported, different data collections can be constructed and made available to an end user.

SUMMARY

In a first aspect of an embodiment of the present invention, a method is provided in a data processing system. The data processing system includes at least one processor and at least one memory. The at least one memory includes instructions executed by the at least one processor to cause the at least one processor to implement a dataset de-identifying system. According to the method, a first set of constraints is determined based on anonymity requirements from a privacy model. A second set of constraints is determined based on knowledge hiding requirements. A model is generated to determine minimum loss of analytic utility in the dataset for de-identification, while satisfying the first set of constraints and the second set of constraints. The model is applied to the dataset to determine changes to the dataset for de-identification that satisfy the first set of constraints and the second set of constraints. De-identified data is produced by modifying the dataset in accordance with the determined changes.

In a second aspect of an embodiment of the present invention, a system for producing de-identified data from a dataset is provided. The system includes at least one processor and at least one memory connected with the at least one processor. The at least one processor is configured to perform: determining a first set of constraints based on anonymity requirements from a privacy model; determining a second set of constraints based on knowledge hiding requirements; generating a model to determine minimum loss of analytic utility in the dataset for de-identification while satisfying the first set of constraints and the second set of constraints; applying the model to the dataset to determine changes to the dataset for de-identification that satisfy the first set of constraints and the second set of constraints; and producing the de-identified data by modifying the dataset in accordance with the determined changes.

In a third aspect of an embodiment of the present invention, a computer program product is provided. The computer program product includes at least one computer readable storage medium having computer readable program code embodied therewith for execution on at least one processor. The computer readable program code is configured to be executed by the at least one processor to perform: determining a first set of constraints based on anonymity requirements from a data privacy model; determining a second set of constraints based on knowledge hiding requirements; generating a model to determine minimum loss of analytic utility in a dataset for de-identification while satisfying the first set of constraints and the second set of constraints; applying the model to the dataset to determine changes to the dataset for de-identification that satisfy the first set of constraints and the second set of constraints; and producing de-identified data by modifying the dataset in accordance with the determined changes.

BRIEF DESCRIPTION OF THE DRAWINGS

Generally, like reference numerals in the various figures are utilized to designate like components.

DETAILED DESCRIPTION

Anonymity requirements define what information in a dataset is to be protected in order for the data set to be considered sufficiently anonymized. Knowledge hiding requirements define what knowledge in the dataset is considered to be sensitive and thereby should be concealed or, equivalently, what knowledge is to be retained in the dataset after protecting the information that is to be protected. An original dataset may be modified to produce a modified (also known as "sanitized") dataset that satisfies all of the anonymity requirements and knowledge hiding requirements that do not conflict with the anonymity requirements. In this way, the modified dataset may be used to control the level of knowledge that is available to users of the modified dataset. In some embodiments, when a conflict exists between the knowledge hiding requirements and one or more anonymity requirements, the one or more anonymity requirements may be relaxed in order to eliminate the conflict.

Given an input dataset that includes personal and/or sensitive information, anonymity requirements and sensitive knowledge hiding requirements, embodiments of the invention produce a new dataset by minimally distorting the input dataset such that all anonymity constraints, based on the anonymity requirements, and all non-conflicting knowledge hiding constraints, which are based on the sensitive knowledge hiding requirements, are supported in the new dataset. Anonymity requirements may be based on a privacy model, which may include, but not be limited to any one of k-anonymity, complete k-anonymity, l-diversity, $k_m$-anonymity and set-based anonymization. Knowledge hiding requirements may be based on hiding sensitive patterns that could be used to infer sensitive knowledge from the dataset, such as knowledge that could disclose trade secrets and give a competitive advantage to a data holder.

Figure 1:
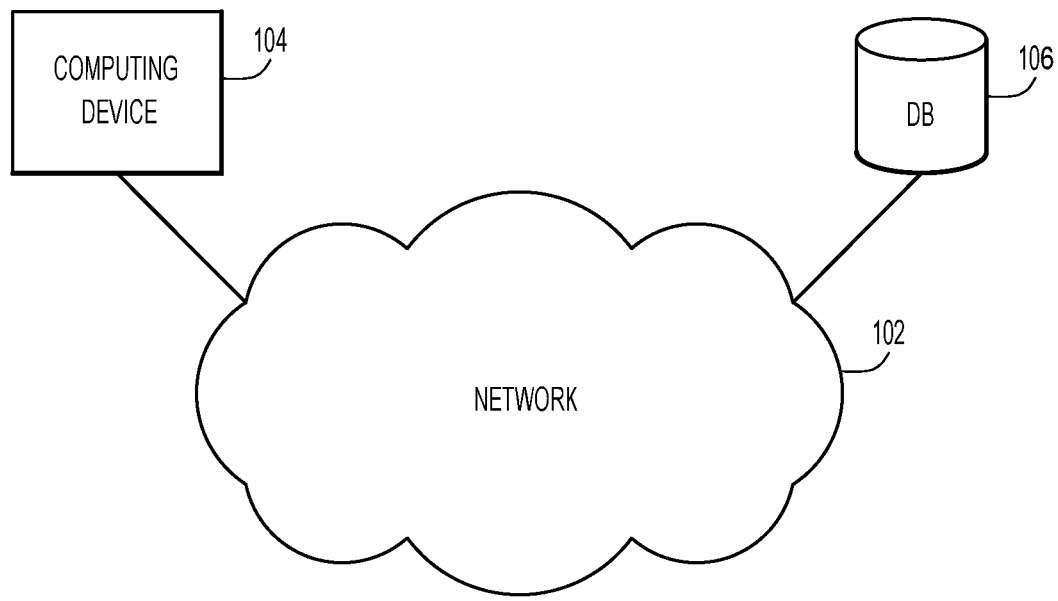
FIG. 1 illustrates an example environment in which embodiments of the invention may operate.

FIG. 1 illustrates an example environment 100 in which various embodiments may operate. Example environment 100 includes a network 102 to which are connected a computing device 104 and a database 106. Computing device 104 and database 106 may be connected to network 102 via a wired or a wireless connection.

Computing device 104 may include, but not be limited to, a mainframe computer, a laptop personal computer or a desktop personal computer. Database 106 may include an original dataset to be minimally modified based on anonymity requirements and knowledge hiding requirements.

Network 102 may be implemented by any number of any suitable communications media (e.g., wide area network (WAN), local area network (LAN), Internet, Intranet, etc.) or a combination of any of the suitable communications media. Network 102 may include wired and/or wireless networks.

Although FIG. 1 shows computing device 104 and database 106 being remote from each other and connected via network 102, computing device 104 and database 106 may be directly connected without a network in other operating environments.

Figure 2:
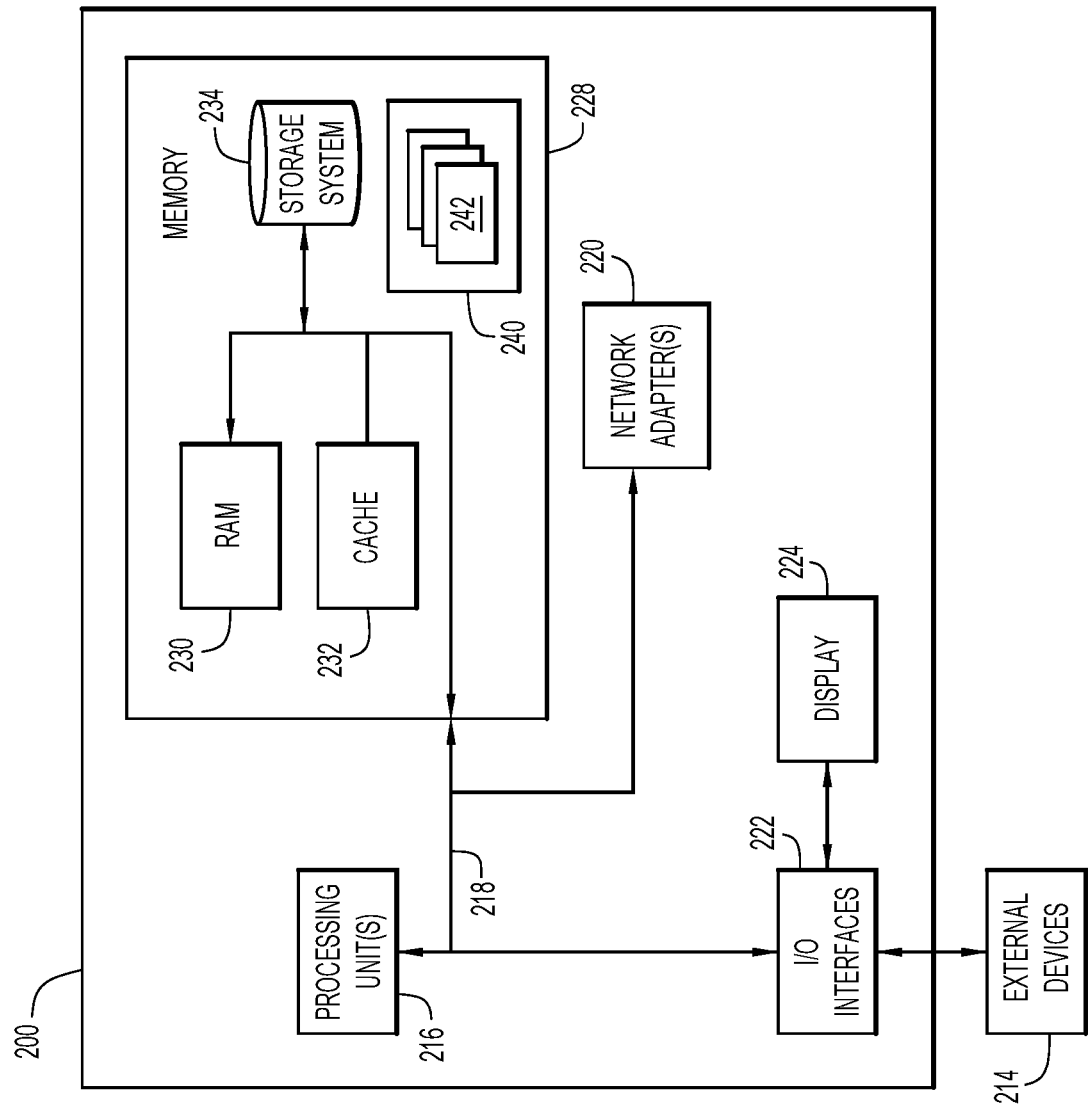
FIG. 2 is a functional block diagram of a computing system that may implement one or more computing devices in various embodiments of the invention.

FIG. 2 is a functional block diagram of a computing system 200 that may implement computing device 104 in various embodiments of the invention. Computing system 200 is shown in a form of a general-purpose computing device. Components of computing system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 200 typically includes a variety of computer system readable media. Such media may be any available media that is accessible by computing system 200, and may include both volatile and non-volatile media, removable and non-removable media.

System memory 228 can include computer system readable media in the form of volatile memory, such as random access memory (RAM) 230 and/or cache memory 232. Computing system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computing system 200 may also communicate with one or more external devices 214 such as a keyboard, a pointing device, one or more displays 224, one or more devices that enable a user to interact with computing system 200, and/or any devices (e.g., network card, modem, etc.) that enable computing system 200 to communicate with one or more other computing devices. Such communication can occur via Input/Output (I/O) interfaces 222. Still yet, computing system 200 can communicate with one or more networks such as a local area network (LAN), a general wide area network (WAN), and/or a public network (e.g., the Internet) via network adapter 220. As depicted, network adapter 220 communicates with the other components of computing system 200 via bus 218. It should be understood that, although not shown, other hardware and/or software components could be used in conjunction with computing system 200. Examples, include, but are not limited to: microcode, device drivers, redundant processing units, external disk drive arrays, RAID systems, tape drives, and data archival storage systems, etc.

Figure 3:
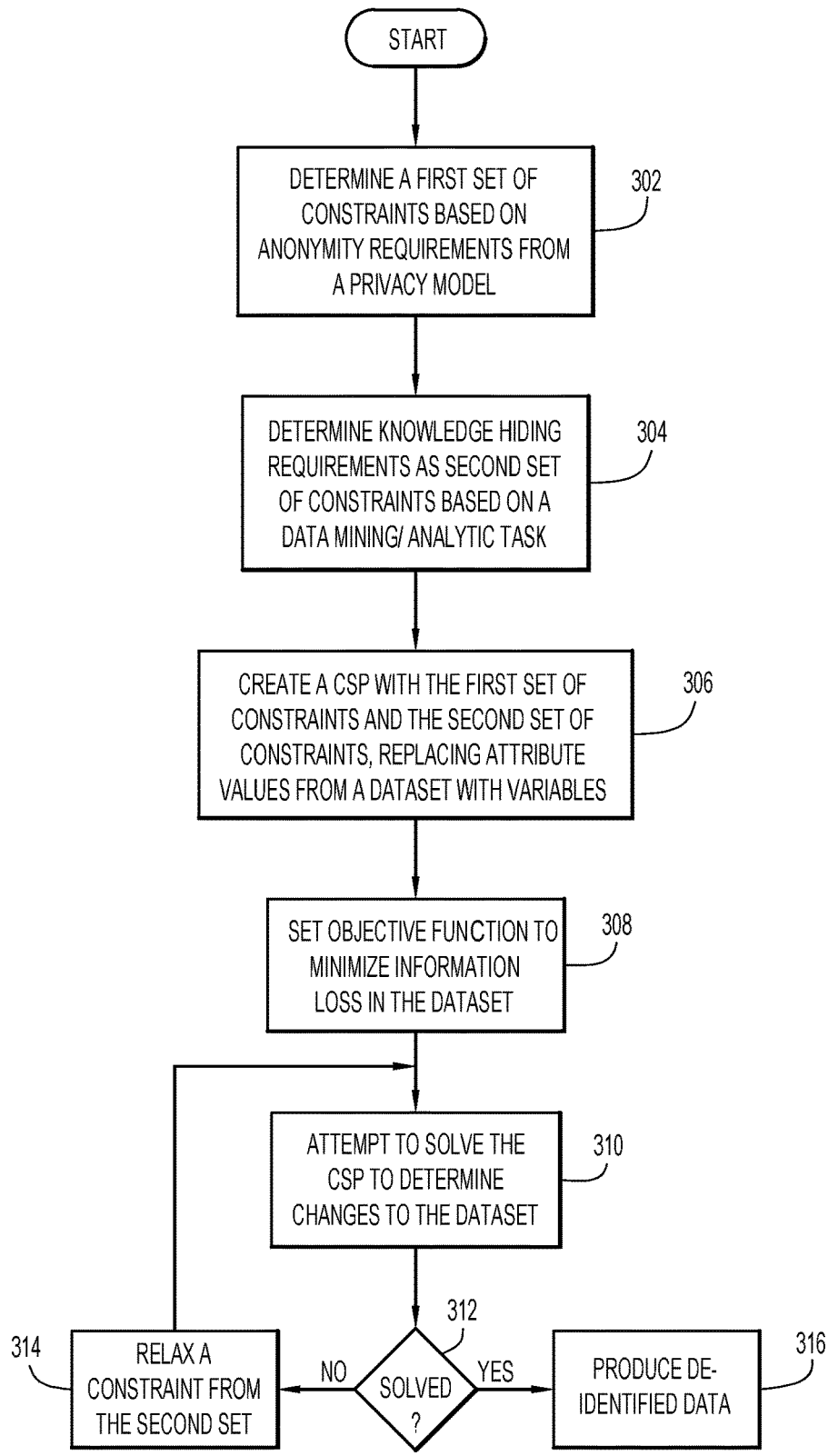
FIG. 3 is a flowchart of an example process that may be performed in various embodiments of the invention.

FIG. 3 is a flowchart that illustrates an example process that may be performed in various embodiments. The process may begin with computing device 104 determining a first set of constraints based on anonymity requirements from a privacy model (act 302). This may be best explained by reference to an example.

In the following example, the considered privacy model is complete k-anonymity, where k=2. Consider a transaction dataset, where each row corresponds to a unique individual, and carries a record ID. For each individual represented in the dataset, a set of diagnoses codes that this individual has been associated with during a hospital visit, is provided. All data values are fictional. The complete k-anonymity model requires that each set of diagnosis codes (also known as "items") that appears in the record of one individual, must also appear in the records of K−1 other individuals in the dataset. Table 1 shows an original dataset having one or more diagnoses codes for each record. The original dataset, in this example, has eight records as shown in Table 1.

TABLE 1

Original Dataset

| ID | Diagnoses Codes |
|---|---|
| 1 | 295.00 295.01 |
| 2 | 205.00 295.01 296.01 |
| 3 | 295.01 296.01 |
| 4 | 296.00 |
| 5 | 295.00 296.00 295.01 296.01 |
| 6 | 296.01 |
| 7 | 295.01 |
| 8 | 295.00 296.00 |

According to the complete k-anonymity privacy model, where k=2, one anonymity constraint is specified for each data record ID as follows:

ID=1: support({1295.00 295.01)})≥2 OR support ({1295.00 295.011})=0

ID=2: support({205.00 295.01 296.01)}≥2 OR support ({205.00 295.01296.01})=0

ID=3: support({295.01 296.01})≥2 OR support({1295.01 296.011})=0

ID=4: support({296.00})≥2 OR support({296.00})=0

ID=5: support({1295.00 296.00 295.01 296.01})≥2 OR support({295.00 296.00 295.01296.0})=0

ID=6: support({296.01})≥2 OR support({296.01})=0

ID=7: support({295.01})≥2 OR support({295.01})=0

ID=8: support({1295.00 296.00})≥2 OR support({1295.00 296.00})=0 where the support (or support count) of a set of items (or itemset) is a number of records in the dataset that contain the corresponding itemset.

Next, one or more knowledge hiding constraints may be determined based on patterns to be concealed (act 304). Typically, each pattern to be concealed corresponds to one sensitive knowledge hiding constraint. Knowledge hiding requirements may be determined by data mining or data analysis, which may reveal patterns. Such patterns may be used to discover sensitive data in a de-identified dataset. In the above example of Table 1, a frequent itemset pattern of {295.00 296.00} is considered to be sensitive and a minimum frequency threshold of 0.2 may be specified. That is, no more than 20% of the record IDs are to contain the sensitive pattern {295.00 296.00} in the sanitized dataset. This can be specified as support({295.00 296.00})<(0.2×8 rows)<1.6 records. Since a number of records should be expressed as an integer, the knowledge hiding constraint should be expressed as support({295.00 296.00})≤1.

The approach used in this example includes protection of anonymity and knowledge hiding using item suppression. Therefore, each record in a resulting de-identified dataset will be associated with a same number of items or fewer items than in the original dataset. Keeping this in mind, an item that is associated with a record, or an individual, in Table 1 may either continue to be associated with the individual or record, or may be deleted (suppressed) from the record. Each item from a record in the original dataset may be replaced with a binary variable as shown in Table 2, where each original item is replaced with a unique binary variable $u_{ij}$, in which i and j, respectively, correspond to a row and column of Table 2. Each binary variable has a value of 1 or 0, where 1 indicates that a corresponding original value remains in the dataset and 0 indicates that the corresponding original value is to be suppressed in the dataset. If each binary variable is replaced with a "1", a result is the original dataset.

TABLE 2

Intermediate Data Representation

| ID | 295.00 | 296.00 | 295.01 | 296.01 |
|---|---|---|---|---|
| 1 | $u_{11}$ | 0 | $u_{13}$ | 0 |
| 2 | $u_{21}$ | 0 | $u_{23}$ | $u_{24}$ |
| 3 | 0 | 0 | $u_{33}$ | $u_{34}$ |
| 4 | 0 | $u_{42}$ | 0 | 0 |
| 5 | $u_{51}$ | $u_{52}$ | $u_{53}$ | $u_{54}$ |
| 6 | 0 | 0 | 0 | $u_{64}$ |
| 7 | 0 | 0 | $u_{73}$ | 0 |
| 8 | $u_{81}$ | $u_{81}$ | 0 | 0 |

A constraint satisfaction problem with a first set of anonymity constraints and a second set of knowledge hiding constraints, may be created (act 306). Rewriting the anonymity and knowledge hiding constraints using the binary variables, results in:

ID=1: $u_{11}u_{13}+u_{21}u_{23}+u_{51}u_{53} \geq 2$ OR $u_{11}u_{13}+u_{21}u_{23}+u_{51}u_{53}=0$ ID=2: $u_{21}u_{23}u_{24}+u_{51}u_{53}u_{54} \geq 2$ OR $u_{21}u_{23}u_{24}+u_{51}u_{53}u_{54}=0$ ID=3: $u_{23}u_{24}+u_{33}u_{34}\, u_{53}u_{54} \geq 2$ OR $u_{23}u_{24}+u_{33}u_{34}+u_{53}u_{54}=0$ ID=4: $u_{42}+u_{52}+u_{82} \geq 2$ OR $u_{42}+u_{52}+u_{82}=0$ ID=5: $u_{51}u_{52}u_{53}u_{54} \geq 2$ OR $u_{51}u_{52}u_{53}u_{54}=0$ ID=6: $u_{24}+u_{34}+u_{54}+u_{64} \geq 2$ OR $u_{24}+u_{34}+u_{54}+u_{64}=0$ ID=7: $u_{13}+u_{23}+u_{33}+u_{53}+u_{73} \geq 2$ OR $u_{13}+u_{23}+u_{33}+u_{53}+u_{73}=0$ ID=8: $u_{51}u_{52}+u_{81}u_{82} \geq 2$ OR $u_{51}u_{52}+u_{81}u_{82}=0$ Knowledge Hiding Constraint: $u_{51}u_{52}+u_{81}u_{82} \leq 1$ For a record to support an itemset, the record must contain all items of the itemset. A product of 1 for corresponding variables indicates that all items of the itemset are present in the record.

The objective function may be set to minimize information loss in the dataset (act 308). Thus, in this example, the constraint satisfaction problem (CSP) to be solved becomes:

$$\text{maximize}(u_{11}+u_{13}+u_{21}+u_{23}+u_{24}+u_{33}+u_{34}+u_{42}+u_{51}+u_{52}+u_{53}+u_{54}+u_{64}+u_{73}+u_{81}+u_{82})$$

subject to $u_{11}u_{13}+u_{21}u_{23}+u_{51}u_{53} \geq 2$ OR $u_{11}u_{13}+u_{21}u_{23}+u_{51}u_{53}=0$
$u_{21}u_{23}u_{24}+u_{51}u_{53}u_{54} \geq 2$ OR $u_{21}u_{23}u_{24}+u_{51}u_{53}u_{54}=0$
$u_{23}u_{24}+u_{33}u_{34}+u_{53}u_{54} \geq 2$ OR $u_{23}u_{24}+u_{33}u_{34}+u_{53}u_{54}=0$
$u_{42}+u_{52}+u_{82} \geq 2$ OR $u_{42}+u_{52}+u_{82}=0$
$u_{51}u_{52}u_{53}u_{54} \geq 2$ OR $u_{51}u_{52}u_{53}u_{54}=0$
$u_{24}+u_{34}+u_{54}+u_{64} \geq 2$ OR $u_{24}+u_{34}+u_{54}+u_{64}=0$
$u_{13}+u_{23}+u_{33}+u_{53}+u_{73} \geq 2$ OR $u_{13}+u_{23}+u_{33}+u_{53}+u_{73}=0$
$u_{51}u_{52}+u_{81}u_{82} \geq 2$ OR $u_{51}u_{52}+u_{81}u_{82}=0$
$u_{51}u_{52}+u_{81}u_{82} \leq 1$
$u_{ij} \in \{0, 1\}, \forall i, j$ Next, an attempt is made to solve the CSP to determine changes to the dataset in order to satisfy the anonymity and knowledge hiding constraints (act 310). A solution to the CSP, in this example, involves assigning a binary value of 0 or 1 to each of the binary variables $u_{ij}$. A last step to solving the CSP involves replacing the binary variables in an intermediate form of the data set, shown in Table 2, with corresponding values of 0 or 1 obtained via the solution of the CSP as shown in Table 3. The zero values in bold correspond to removed items from the original dataset. Only two values have been removed to solve the CSP in this example.

TABLE 3

Solution of the CSP

| ID | 295.00 | 296.00 | 295.01 | 296.01 |
|---|---|---|---|---|
| 1 | 1 | 0 | 1 | 0 |
| 2 | 1 | 0 | 1 | 1 |
| 3 | 0 | 0 | 1 | 1 |
| 4 | 0 | 1 | 0 | 0 |
| 5 | 1 | 0 | 1 | 1 |
| 6 | 0 | 0 | 0 | 1 |
| 7 | 0 | 0 | 1 | 0 |
| 8 | 0 | 1 | 0 | 0 |

A solution to the above-mentioned CSP is found by using integer programming techniques, which are well known. For the above example, the set of constraints for the anonymity requirements involves a special case having a disjunction with an inequality and an equation. Constraint satisfaction problems involving generalized linear constraints that include disjunctions with equations and inequalities have been studied.

According to FIG. 3, various embodiments may determine whether the CSP is solved (act 312) by determining whether a possible solution satisfies the anonymity constraints, the knowledge hiding constraints and the objective function regarding minimizing information loss in the dataset. If the CSP is determined to be solved, then de-identified data is produced (act 316), as shown in Table 4 for this example, in which the value (item) 296.00 is suppressed in record ID 5 and the value (item) 295.00 is suppressed in record ID 8.

TABLE 4

De-identified Dataset

| ID | Diagnoses Codes |
| --- | --- |
| 1 | 295.00 295.01 |
| 2 | 205.00 295.01 296.01 |
| 3 | 295.01 296.01 |
| 4 | 296.00 |
| 5 | 295.00 ~~296.00~~ 295.01 296.01 |
| 6 | 296.01 |
| 7 | 295.01 |
| 8 | ~~295.00~~ 296.00 |

In cases in which multiple solutions having a same distance, or objective criterion, exist, one solution may be selected at random. Alternatively, a second selection criterion may be used to decide which solution to select.

In cases in which a solution for the CSP cannot be determined due to the anonymity constraints conflicting with the knowledge hiding constraints, then a conflicting knowledge hiding constraint may be relaxed, or removed, from the CSP (act 314) and another attempt is made to solve the CSP (act 310). It should be noted that the anonymity constraints alone will always—by construction—be solvable. Therefore, a produced CSP will always be able to provide a required anonymity level, regardless of a number of sensitive knowledge patterns that will be hidden.

Although the above example uses the complete k-anonymity privacy model with minimum data distortion, other privacy models may also be used including, but not limited to, 1-diversity, $k^m$-anonymity and set-based anonymization. As previously mentioned, in the above example, all items involved in anonymity and knowledge hiding constraints were replaced with binary variables. However, in other cases, fewer original items may be replaced with binary variables.

Different approaches for solving a CSP may be used depending on a type of constraints that are produced in the CSP due to a type of privacy model to be enforced and a type of sensitive knowledge patterns to be concealed. Further, different strategies for relaxing constraints for unsolvable CSPs may be used in order to determine a solution. In some embodiments, machine learning may be employed to relax or modify the knowledge hiding constraints.

In the above example, the optimization criterion involved minimizing data distortion, which was captured as a distance between an original data set and its de-identified counterpart. In other embodiments, other optimization criteria may be used instead of distance in order to ensure that a produced solution maintains high data utility. For example, in some embodiments, a sanitized dataset may be used for supporting a particular analytic task. In this situation, data utility is to be maintained such that the modified dataset supports this particular analytic task. Accordingly, an optimization criterion can be specified such that a solution of the CSP maximizes utility of the modified dataset for supporting the analytic task.

Due to a complexity of solving very large CSPs, which contain many constraints and variables, heuristic techniques and techniques that are based on structural CSP decomposition and parallel solving may also be used to reduce data operations and provide faster de-identification.

It will be appreciated that the embodiments described above and illustrated in the drawings represent only a few of the many ways of implementing various embodiments.

The environment of the present invention embodiments may include any number of computer or other processing systems and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various computing systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to server and/or client systems. The database systems and/or storage structures may be remote from or local to a computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as, for example, radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figs. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A system for producing de-identified data from a dataset, the system comprising:
   at least one processor; and
   at least one memory connected with the at least one processor, wherein the at least one processor is configured to perform:
   determining a first set of constraints based on anonymity requirements from a privacy model, each record of the dataset having an anonymity constraint of the first set of constraints;
   determining a second set of constraints based on knowledge hiding requirements, each constraint of the second set of constraints corresponding to a respective pattern to be concealed in the de-identified data;
   generating a model to determine minimum loss of analytic utility in the dataset for de-identification while satisfying the first set of constraints and the second set of constraints, the generating the model further comprising:
   selectively replacing items in each constraint of the first set of constraints and items in each constraint of the second set of constraints with binary variables used by a constraint satisfaction problem, wherein each of the binary variables indicates either a presence or an absence of a corresponding item in the de-identified data, and
   assigning a value to each of the binary variables such that the first set of constraints and the second set of constraints are satisfied and a sum of all of the binary variables of the constraint satisfaction problem is maximized;
   applying the model to the dataset to determine changes to the dataset for de-identification that satisfy the first set of constraints and the second set of constraints, the applying the model further comprising:
   formulating and solving the constraint satisfaction problem, and
   determining ones of items of the dataset to be changed based on values of the binary variables of the constraint satisfaction problem; and
   producing the de-identified data by modifying the dataset in accordance with the determined changes.

2. The system of claim 1, wherein the producing the de-identified data by modifying the dataset in accordance with the determined changes further comprises:
   suppressing the determined ones of the items of the dataset to produce the de-identified data.

3. The system of claim 1, wherein the at least one processor is further configured to perform:
   identifying one or more conflicts in the model between the first set of constraints and the second set of constraints; and
   relaxing one or more constraints of the second set of constraints in the model to determine the changes to the dataset.

4. The system of claim 1, wherein the privacy model includes one from a group consisting of k-anonymity, complete k-anonymity, l-diversity, km-anonymity and set-based anonymization.

5. A computer program product comprising at least one computer readable storage medium having computer readable program code embodied therewith for execution on at least one processor, the computer readable program code being configured to be executed by the at least one processor to perform:
   determining a first set of constraints based on anonymity requirements from a privacy model, each record of a dataset having an anonymity constraint of the first set of constraints;
   determining a second set of constraints based on knowledge hiding requirements, each constraint of the second set of constraints corresponds to a respective pattern to be concealed in de-identified data;

generating a model to determine minimum loss of analytic utility in a dataset for de-identification while satisfying the first set of constraints and the second set of constraints, the generating the model further comprising:
  selectively replacing items in each constraint of the first set of constraints and items in each constraint of the second set of constraints with binary variables used by the constraint satisfaction problem, wherein each of the binary variables indicates either a presence or an absence of a corresponding item in the de-identified data, and
  assigning a value to each of the binary variables such that the first set of constraints and the second set of constraints are satisfied and a sum of the binary variables of the constraint satisfaction problem is maximized;

applying the model to the dataset to determine changes to the dataset for de-identification that satisfy the first set of constraints and the second set of constraints, the applying the model comprising:
  formulating and solving the constraint satisfaction problem, and
  determining ones of items of the dataset to be changed based on values of the binary variables of the constraint satisfaction problem; and producing the de-identified data by modifying the dataset in accordance with the determined changes.

6. The computer program product of claim 5, wherein the computer readable program code is configured to be executed by the at least one processor to perform:
  identifying one or more conflicts in the model between the first set of constraints and the second set of constraints; and
  relaxing one or more constraints of the second set of constraints in the model to determine the changes to the dataset.

* * * * *